(12) United States Patent
Leutard et al.

(10) Patent No.: US 10,400,810 B2
(45) Date of Patent: Sep. 3, 2019

(54) EXTRACTION SLEEVE

(71) Applicant: SAFRAN AIRCRAFT ENGINES, Paris (FR)

(72) Inventors: Florence Irène Noëlle Leutard, Samoreau (FR); Pierrick Raphael Americo Bauduin, Caen (FR); Olivier Renon, Bois le Roi (FR); Patrick Sultana, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 100 days.

(21) Appl. No.: 15/515,446

(22) PCT Filed: Sep. 29, 2015

(86) PCT No.: PCT/FR2015/052605
§ 371 (c)(1),
(2) Date: Mar. 29, 2017

(87) PCT Pub. No.: WO2016/051080
PCT Pub. Date: Apr. 7, 2016

(65) Prior Publication Data
US 2017/0219002 A1 Aug. 3, 2017

(30) Foreign Application Priority Data
Sep. 30, 2014 (FR) .................................... 14 59247

(51) Int. Cl.
*F16B 37/12* (2006.01)
*F01D 5/00* (2006.01)
*F01D 25/24* (2006.01)

(52) U.S. Cl.
CPC ............ *F16B 37/122* (2013.01); *F01D 5/005* (2013.01); *F01D 25/243* (2013.01); *F05D 2260/30* (2013.01)

(58) Field of Classification Search
USPC .......................................................... 29/258
See application file for complete search history.

(56) References Cited

U.S. PATENT DOCUMENTS 3,566,947 A * 3/1971 Jukes .................... F16B 37/122
29/523
3,756,287 A * 9/1973 Bishop .................... F16L 45/00
138/92

(Continued)

FOREIGN PATENT DOCUMENTS

DE    25 22 817 B1    5/1976
GB      654747 A    6/1951

OTHER PUBLICATIONS

International Search Report as issued in International Patent Application No. PCT/FR2015/052605, dated Jan. 18, 2016.

*Primary Examiner* — Gary W Estremsky
(74) *Attorney, Agent, or Firm* — Pillsbury Winthrop Shaw Pittman LLP

(57) ABSTRACT

An extraction sleeve for extracting two rotationally symmetrical parts that are joined together by interference fit, the extraction sleeve including: a head having a conical part; a cylindrical body, the internal part of the cylindrical body having a screw thread suitable for the screwing of an extraction screw; the conical part of the head of the extraction sleeve forming a friction component suitable for coming into contact with one of the rotationally symmetrical parts, the friction component being designed so as to determine a limit slipping torque greater than the friction torque generated at the screw thread of the sleeve by screwing of the extraction screw.

6 Claims, 2 Drawing Sheets

(56) References Cited

U.S. PATENT DOCUMENTS

| | | | | |
|---|---|---|---|---|
| 5,133,641 | A | * | 7/1992 | Groenendaal, Jr. ... F01D 25/243 248/672 |
| 6,199,453 | B1 | * | 3/2001 | Steinbock ............. B23P 19/068 29/452 |
| 6,671,959 | B1 | * | 1/2004 | Skaggs ................. B25B 27/062 29/256 |
| 2005/0044685 | A1 | * | 3/2005 | Brooks ................... B25B 27/16 29/426.5 |
| 2006/0116680 | A1 | * | 6/2006 | Kugler .................... A61B 17/92 606/86 B |
| 2010/0101065 | A1 | | 4/2010 | Macchia et al. |
| 2013/0175773 | A1 | * | 7/2013 | Sherley ................. A63C 17/01 280/11.19 |
| 2015/0089782 | A1 | * | 4/2015 | Wasileski, III ......... F01D 25/24 29/281.5 |

* cited by examiner

EXTRACTION SLEEVE

CROSS-REFERENCE TO RELATED APPLICATIONS

This is the U.S. National Stage of PCT/FR2015/052605, filed Sep. 29, 2015, which in turn claims priority to French Patent Application No, 1459247, filed Sep. 30, 2014, the entire contents of all applications are incorporated herein by reference in their entireties.

TECHNICAL DOMAIN OF THE INVENTION

The domain of the invention relates to extraction sleeves for the disassembly of two parts fixed together by interference fit.

One particularly interesting application of the invention is in the aeronautical field and particularly extraction of a shrink-fitted cylindrical connection, for example at the interface between the sealing plate and the ejection tube support of a turbine machine.

TECHNOLOGICAL BACKGROUND OF THE INVENTION

A turbine machine or turbojet comprises a large number of bolted connections in the "stator" part and in the "rotor" part of the turbine machine. Some of these bolted connections are also accompanied by a shrink-fitted cylindrical connection.

These connections sometimes have to be disconnected, particularly during maintenance operations. The normal method of disassembling two flanges shrink-fitted to each other is to use extraction means such as screw sleeves to avoid damaging the flanges during disassembly. These extraction sleeves are fixed to one of the interface flanges and are used to separate the two flanges in a shrink-fitted connection.

It is known that extraction sleeves can be welded to prevent the extraction sleeve from dropping during the interference fit operation or to be sure that the torque induced by the extraction screw will be resisted by the connection between the extraction sleeve and the flange that supports it.

However, extraction sleeves welded to the flange create some difficulties. The weld of the sleeve can cause deformation of the flange in a zone close to the weld, particularly when the flanges are thin, for example of the order of a few millimeters, typically of the order of 3 to 4 millimeters.

One solution to solve the problems mentioned above consists of simply shrink-fitting the extraction sleeves in the orifices of the flanges provided for this purpose. However, with this interference fit solution, there is a risk of the sleeve slipping in the flange if this interference fit is not well sized, which would make the extraction sleeve unusable, since it would rotate in its housing during the extraction attempt, under the effects of friction of the extraction screw in the threads of the sleeve. Another problem could be damage to the sleeve if the interference fit is too strong.

GENERAL DESCRIPTION OF THE INVENTION

In this context, the invention aims to provide a solution to the problems mentioned above, and to disclose an extraction sleeve to guarantee the feasibility of disassembling two shrink fitted parts and eliminate the need for a weld to guarantee that contact interfaces remain plane.

To achieve this, the invention relates to an extraction sleeve for the extraction of two parts of revolution assembled by interference fit, said sleeve being characterised in that it comprises:
- a head with a conical part;
- a cylindrical-shaped body, the internal part of the cylindrical body having a screw thread adapted to enable screwing of an extraction screw;
- said conical part of the head of the extraction sleeve forming a friction means adapted to come into contact with one of the parts of revolution, said friction means being sized so as to determine a limiting slip torque higher than the friction torque generated at the sleeve screw thread by screwing the extraction screw.

Thus, the extraction sleeve according to the invention eliminates the need for an operation to weld the sleeve onto the flange, avoiding deformation of the flange, particularly when it is thin (typically of the order of a few millimeters).

With the sleeve according the invention, the cone of the sleeve head generates an increasingly high torque as the extraction force increases. Thus, the sleeve according to the invention makes it possible to extract shrink-fitted parts requiring a strong extraction force.

The extraction sleeve according to the invention can also have one or several of the following characteristics, taken individually or in any technically possible combination:
- the conical part of the head has an angle of inclination $\alpha$ from the longitudinal axis of the sleeve;
- the angle of inclination $\alpha$ is between 10° and 60°;
- the angle of inclination $\alpha$ is equal to 45°.

Another purpose of the invention is a disassembly extraction system that comprises the following, for a turbine machine:
- a first part of revolution with an attachment flange and a second part of revolution with an attachment flange, the two parts of revolution being assembled by interference fit at their attachment flange;
- a plurality of extraction sleeves according to one of the above claims;
- said attachment flange of the first part of revolution having a plurality of orifices distributed around the periphery of said flange adapted to hold said extraction sleeves;
- the extraction sleeve according to the invention is adapted to extract two parts of revolution from a turbine machine assembled by interference fit.

Advantageously, the system includes a plurality of extraction screws with a screw thread adapted to cooperate with said plurality of extraction sleeves.

The invention will be better understood after reading the following description.

BRIEF DESCRIPTION OF THE FIGURES

Other characteristics and advantages of the invention will become clear after reading the following description with reference to the appended figures.

DETAILED DESCRIPTION OF EXAMPLE EMBODIMENTS OF THE INVENTION

Figure 1:
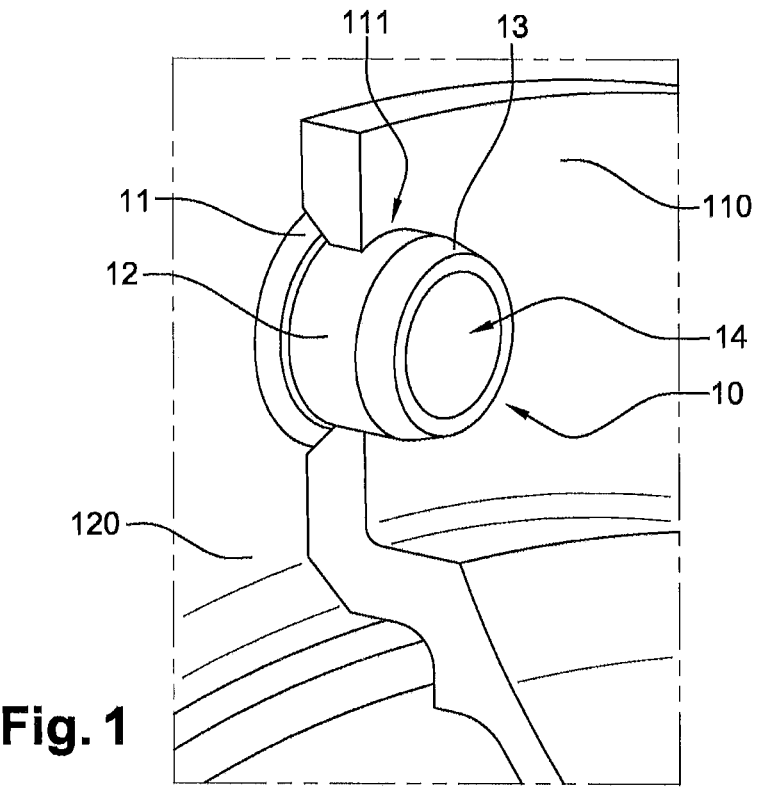
FIG. 1 is a perspective view illustrating part of a cylindrical connection made by interference, between two parts of revolution of a turbine machine, presenting a first embodiment of an extraction sleeve according to the invention.

FIG. 1 is perspective view illustrating part of a cylindrical connection made by interference fit, between two parts of revolution of a turbine machine. This shrink-fitted connection type is additional to bolted connections (not shown), for example made between the sealing plate and the ejection tube support of a turbine machine.

Figure 2:
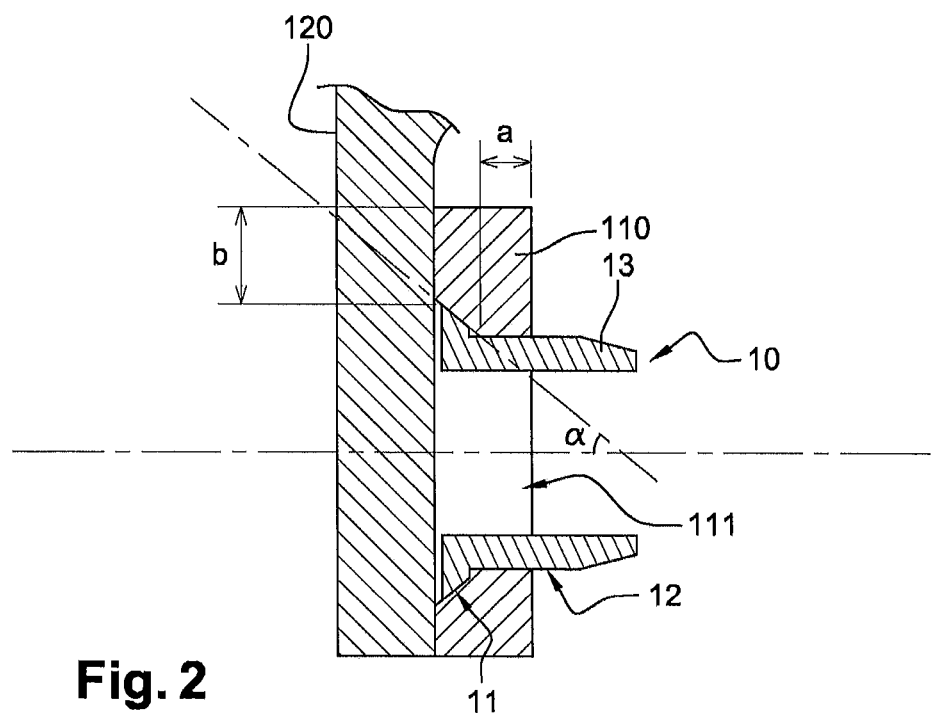
FIG. 2 represents a sectional view of the connection illustrated in FIG. 1.

The two parts of revolution of a turbine machine are assembled by means of attachment flanges. FIG. 1 illustrates particularly two attachment flanges 110 and 120 of two parts of revolution to be assembled. FIG. 2 is a sectional view of this assembly.

As described above, in addition to the bolted type attachment means used to assemble two parts of revolution in a turbine machine, it is also known that hot interference fit can be made between these two parts to provide an additional attachment means.

The extraction sleeve 10 according to the invention is capable of applying an appropriate mechanical stress to disassemble these two shrink-fitted parts when the bolted type connections have been removed.

The extraction sleeves 10 are positioned on one of the two attachment flanges 110, 120. In the example embodiment illustrated in FIGS. 1 and 2, the extraction sleeves 10 are positioned on the flange 110 (a single flange being illustrated on the figures), so as to extract the flange 120. To achieve this, the flange 110 has a plurality of orifices 111 distributed around the periphery of the flange 110 so that the extraction sleeves 10 according to the invention can be installed. The distribution of extraction sleeves around the periphery of the flange 110 thus helps to distribute the extraction force on all sleeves 10.

The extraction sleeve 10 according to this invention has:
  a first part 11 forming the head of the sleeve 10; this first part 11 being practically conical;
  a second part 12 forming the body of the sleeve 10; this second part 11 being practically cylindrical.

Advantageously, the body 12 of the sleeve 10 has a chamfered part 13 at its second end; i.e. at the end opposite the head 11 of the sleeve 10, thus reducing the outside diameter of the body of the sleeve 10. This chamfered part 13 facilitates positioning of the sleeve 10 in the orifices 111 of the flange 110 during installation operations.

The sleeve 10 also has a threaded through reaming 14 adapted to hold an extraction screw (not shown). Advantageously, the extraction sleeve 10 is threaded with a fine thread pitch to hold classical extraction screws.

The head 11 of the extraction sleeve 10 is approximately conical in shape. The angle of inclination of the cone of the head 11 is denoted a and represents the angle of inclination of the cone relative to the longitudinal axis of the sleeve 10.

The orifice 111 is milled to hold the milled head 11 (conical) of the sleeve 10, so that the sleeve fits into the flange 110. The milling of the orifice 111 is made at the face of the flange 110 located at the interface of the two fitted flanges 110, 120. Obviously, the angle of inclination of the milling corresponds to the angle of inclination α of the cone of the head 11 of the sleeve 10.

The sleeve 10 is advantageously assembled by force fitting (or cold interference fitting) in the orifices 111, over its cylindrical part to prevent it from falling from the orifice 111 during flange manipulation operations or during assembly/disassembly operations. However, the force fitted assembly of the sleeve 10 is not designed to resist the friction torque generated by the extraction screw in the threads of the sleeve during the extraction operation.

Thus, when the extraction sleeve (not shown) is screwed into the sleeve 10, the free end of the screw 10 that stops in contact with the second flange 120 and the conical part of the sleeve 10 will be forced into contact with the milling of the orifice 111. The two conical faces in contact then generate a friction torque and the flanges tend to move apart for extraction. The two conical faces do not slip relative to each other, as long as the limiting slip torque is not reached. This limiting slip torque depends on:
  the angle of inclination α;
  the contact force of the sleeve 10 that is equal to the extraction force necessary to extract the two shrink-fitted flanges 110, 120;
  the coefficient of friction between the two materials 110 and 120;
  the geometry of the sleeve 10.

The limiting slip torque between the two conical parts of the sleeve and the flange or the moment that can be transmitted by the sleeve without the sleeve moving is given by the following formula:

$$M_{transmissible} = \frac{2}{3\sin\alpha} fN \frac{(R^3 - r^3)}{(R^2 - r^2)}$$

In which:
  f the coefficient of friction of the conical part between the sleeve and the flange:
  N the axial force generated on the sleeve by screwing of the extraction screw:
  R the radius of the cone at its widest part from the sleeve rotation axis:
  r the radius of the cone at its narrowest part from the sleeve rotation axis:
  α the angle of inclination of the cone.

Thus, the angle of inclination α of the cone is determined such that the limiting slip torque between the conical parts is higher then the friction torque induced by the extraction screw during screwing of the extraction screw into the sleeve 10.

The angle of inclination α of the cone is advantageously between 10° and 60°. According to one particularly advantageous embodiment of the invention, the chosen angle of inclination is close to 45°.

However, it should be checked that the chosen angle of inclination α of the cone is such that integration constraints into the turbine machine can be respected. Thus, some dimensional constraints have to be respected, and particularly the minimum distance between the milling of the orifice 111 relative to the peripheral end of the flange 110 marked as reference b on FIG. 2, and the minimum material thickness at the straight part of the orifice 111 to resist the forces from the sleeve reference a on FIG. 2.

For example, the minimum distance of the orifice 111 from the end of the flange 110 is typically of the order of 2 to 5 mm, with a minimum value of 1 mm and the flange thickness at the straight part of the orifice 111 is equal to at least 1 mm, and preferably more than 2 mm.

Figure 3:
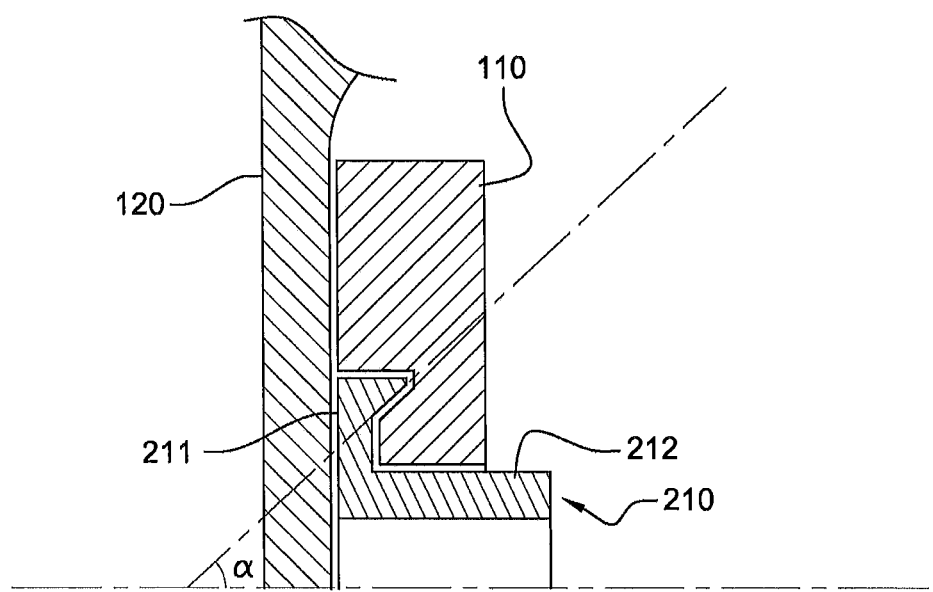
FIG. 3 illustrates a second embodiment of an extraction sleeve according to the invention.

FIG. 3 illustrates a variant embodiment of the extraction sleeve 210 according to the invention. In this example embodiment, the contact surface is obtained by the mushroom shape of the head 211 of the sleeve that has one part approximately perpendicular to the longitudinal axis of the sleeve terminating by a circular shoulder chamfered in its lower part with an angle of inclination α so as to form a friction cone like that described in the first embodiment.

Obviously, the milling of the flange 110 is adapted and its shape is complementary to the shape of the head 211 of the sleeve 210.

The invention claimed is:

1. An extraction sleeve for the extraction of two parts of revolution assembled by interference fit, said extraction sleeve comprising:
   a head with a conical part; and
   a cylindrical-shaped body, an internal part of the cylindrical body having a screw thread adapted to enable screwing of an extraction screw, the cylindrical-shaped body having an external part without a screw thread;
   said conical part of the head of the extraction sleeve forming a friction component adapted to come into contact with one of the two parts of revolution, said friction component being sized so as to determine a limiting slip torque higher than a friction torque generated at the sleeve screw thread by screwing the extraction screw, wherein an angle of inclination of the conical part of the head relative to a longitudinal axis of the extraction sleeve is equal to 45°.

2. A disassembly extraction system that comprises, for a turbine machine:
   a first part of revolution with an attachment flange and a second part of revolution with an attachment flange, the first and second parts of revolution being assembled by interference fit at their attachment flange;
   a plurality of extraction sleeves, each of the plurality of extraction sleeves including
      a head with a conical part; and
      a cylindrical-shaped body, an internal part of the cylindrical body having a screw thread adapted to enable screwing of an extraction screw, the cylindrical-shaped body having an external part without a screw thread;
   said conical part of the head of the extraction sleeve forming a friction component adapted to come into contact with one of the first and second parts of revolution, said friction component being sized so as to determine a limiting slip torque higher than a friction torque generated at the sleeve screw thread by screwing the extraction screw;
   said attachment flange of the first part of revolution having a plurality of orifices distributed around a periphery of said attachment flange adapted to hold said extraction sleeves.

3. The disassembly extraction system according to claim 2, wherein an angle of inclination of the conical part of the head relative to a longitudinal axis of the extraction sleeve is equal to α.

4. The disassembly extraction system according to claim 3, wherein the angle of inclination α is between 10° and 60°.

5. The disassembly extraction system according to claim 2, wherein the extraction sleeve is adapted for the extraction of two parts of revolution of a turbine machine assembled by interference fit.

6. The disassembly system according to claim 2, further comprising a plurality of extraction screws with a screw thread adapted to cooperate with said plurality of extraction sleeves.

* * * * *